Jan. 22, 1957 W. SHOCKLEY 2,778,885
SEMICONDUCTOR SIGNAL TRANSLATING DEVICES
Filed Oct. 31, 1952
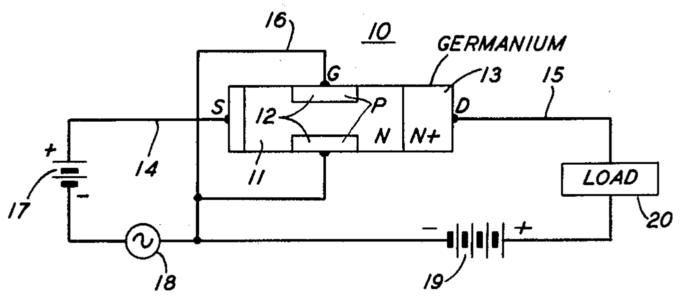
INVENTOR
W. SHOCKLEY
BY
ATTORNEY United States Patent Office 2,778,885

Patented Jan. 22, 1957

2,778,885

SEMICONDUCTOR SIGNAL TRANSLATING DEVICES

William Shockley, Madison, N. J., assignor to Bell Telephone Laboratories, Incorporated, New York, N. Y., a corporation of New York Application October 31, 1952, Serial No. 317,884

1 Claim. (Cl. 179—171)

This invention relates to semiconductor signal translating devices and more particularly to such devices of the type disclosed in the application Serial No. 243,541, filed August 24, 1951 of W. Shockley which issued May 8, 1956 as Patent 2,744,970.

Devices of the type disclosed in the above identified application comprise, generally, a body of semiconductive material having therein a region or zone of one conductivity type flanked by and contiguous with a pair of zones of the opposite conductivity type. Individual connections, herein termed the source and drain, are made to opposite ends of the first zone, and a third connection, termed the gate herein, is made to the other two zones in common. Both the source and drain are biased relative to the gate so that the PN junctions between contiguous zones are biased in the reverse direction, the potential of the drain, however, being substantially greater than that of the source. Signals are impressed between the source and gate and amplified replicas thereof are obtained in a load or utilization circuit connected between the gate and drain. In effect, the variations in the potential of the gate control the flow of electrical carriers in the intermediate zone from the source to the drain.

One general object of this invention is to improve the performance of signal translating devices of the type above described. More specific objects of this invention are to enable control of the input-output relation for such devices and to increase the stability thereof.

It has been found that the operating characteristics of translating devices of the type above described are dependent upon the nature of the region adjacent the drain. More specifically, it has been found that there may be a flow of anomalous or minority carriers from the drain region and that these may return to the gate. Such flow, if uncontrolled, tends to instability in the devices and results in unpredictable or undesirable input-output relations.

In accordance with one broad feature of this invention, the drain region is constructed to determine or control the flow of minority carriers therefrom.

Specifically, in accordance with one feature, the portion of the semiconductive body adjacent the drain connection is constructed to substantially impede or suppress flow of minority carriers away therefrom. For example, in one illustrative embodiment, wherein the intermediate zone of the semiconductive body is of N conductivity type, the majority carriers involved in the operation, that is those which are injected at the source and flow to the drain, are electrons. The minority carriers, then, are holes. As the PN junctions are biased in the reverse direction, it will be appreciated that there is a possibility that the field in the gate-drain region, due to the biases and augmented by majority carrier flow, might be such as to enable holes in the proximity of the drain to reach the gate. To prevent action of this nature, the portion of the semiconductive body adjacent the drain connection is made more strongly N type than the bulk of the intermediate zone whereby the field gradients in the gate-drain region are such as to oppose flow of holes away from the drain.

The invention and the above noted and other features thereof will be understood more clearly and fully from the following detailed description with reference to the accompanying drawing in which the single figure is a diagram representing the principal components of a signal translating device constructed in accordance with this invention.

This device comprises a bar or wafer 10 of semiconductive material, for example germanium or silicon, having therein a region 11 of N conductivity type as indicated by the letter N thereon and two zones or regions 12 of P conductivity type in opposite faces thereof. The body 10 includes also at one end a region 13 of the same conductivity type as the region 11 but more strongly so, that is having a resistivity substantially smaller than that of the region 11.

A substantially ohmic source connection 14 is made to one end of the region or zone 11 and a second substantially ohmic drain connection 15 is made to the zone 13. Also substantially ohmic gate connections 16 are made to the zones 12, the two being tied together as indicated in the drawing.

Both the source and drain are biased in the reverse direction relative to the gate 16 whereby the junctions between the zones 12 and the bulk 11 of the body likewise are biased in the reverse direction and space charge regions of substantial extent obtain thereat. The source may be biased as by a battery 17 in series with a signal source or generator 18. Similarly, the drain may be biased as by a battery 19 in series with a load 20. The bias on the drain is substantially greater than that upon the source thereby to establish a field of polarity to attract majority carriers in the region 11 from the source to the drain.

In the device wherein the zones are of conductivity type represented in Fig. 1, the majority carriers in the region 11 are electrons. Thus, there is a flow of electrons from source 14 to the drain 15. The path for these electrons it will be noted passes between the space charge regions adjacent the PN junctions between the zones 12 and the region 11. The extent of these space charge regions is dependent upon the magnitude of the bias across the junctions and is variable in accordance with signals impressed between source and gate from the signal source or generator 18. As the space charge regions vary in extent the conductance of the path over which the majority carriers flow from the source to the drain is likewise varied; thus the current delivered to the load 20 is varied in accordance with the signals applied to the gate. As pointed out in the application of W. Shockley hereinabove identified, voltage and power gains are obtained.

It has been found, as indicated hereinabove, that there is a tendency in devices of constructions known heretofore for a flow of minority carriers from the drain to the gate. For the specific device illustrated in the drawing, such minority carriers are holes. The potential applied to the zones 12 is, of course, such as to attract holes to these zones. This factor together with the charge due to the majority carriers tends to establish in the region between the gate and drain a field conducive to flow of minority carriers, that is holes, from the drain to the gate. However, in accordance with one feature of this invention, such minority carrier flow is substantially impeded or suppressed by the provision of the zone 13. This zone being strongly of the type associated with the majority carrier flow, enhances suppression of or eliminates minority carriers adjacent the drain as by recombination effects and further introduces in the vicinity of the drain a field gradient such as to reduce flow of minority carriers away from the drain. Thus, minority carrier current from the drain to the gate is substantially suppressed whereby the input-output characteristic of the device is stabilized. That is, such disturbances and distortions as would result from minority carrier current to the gate are eliminated.

In a typical device, the semiconductive body 10 may be of germanium 0.025 cm. by 0.1 cm. by 0.3 cm. with the P zones 12 spaced of the order of 0.01 cm., the N zone or region having a resistivity of 30 ohm centimeter and the zone 13 adjacent the drain having a resistivity of 0.1 ohm centimeter.

Although in the specific embodiment illustrated in the drawing and hereinabove described, the gate zones 12 are of P conductivity type and the region or zones 11 and 13 are of N conductivity type, the invention may be employed also in devices wherein the conductivity types are the reverse of those indicated in the drawing. That is, the zones 12 may be of N type and the zones or regions 11 or 13 of P type with the zone 13 more strongly P type than the region 11. Also it will be understood that although a specific embodiment of this invention has been shown and described various modifications may be made therein without departing from the scope and spirit of this invention.

What is claimed is:

A signal translating device comprising a body of semiconductive material having therein an extended region of one conductivity type which region is characterized by a constricted intermediate portion and an end portion which is of conductivity higher by a factor of at least several hundred than the remainder of said region, the body further including a pair of juxtaposed zones of the opposite conductivity type on opposite sides of the constricted intermediate portion of the extended region for defining therewith a pair of juxtaposed rectifying junctions, a gate connection to the pair of juxtaposed zones, a drain connection to the high conductivity end portion of the extended region, a source connection to the opposite end of the extended region, an input circuit connected between the source and gate connections, and an output circuit connected to the drain connection.

References Cited in the file of this patent

UNITED STATES PATENTS

| | | |
|---|---|---|
| 2,502,479 | Pearson et al. | Apr. 4, 1950 |
| 2,524,035 | Bardeen et al | Oct. 3, 1950 |
| 2,561,411 | Pfann | July 24, 1951 |
| 2,569,347 | Shockley | Sept. 25, 1951 |
| 2,600,500 | Haynes et al | June 17, 1952 |